Jan. 27, 1970  B. B. KING  3,491,750
STETHOSCOPIC AND ELECTRICAL CARDIOMETER
Filed June 23, 1966  2 Sheets-Sheet 1
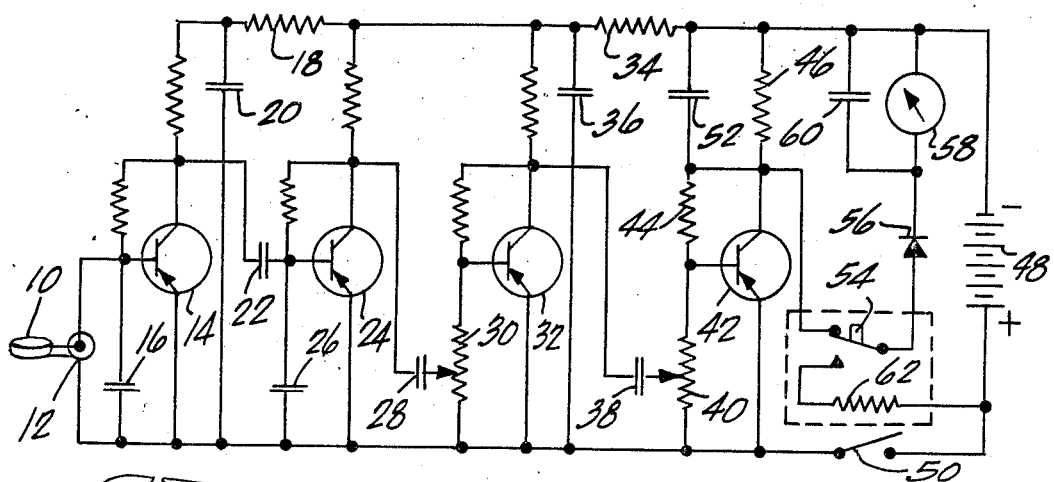
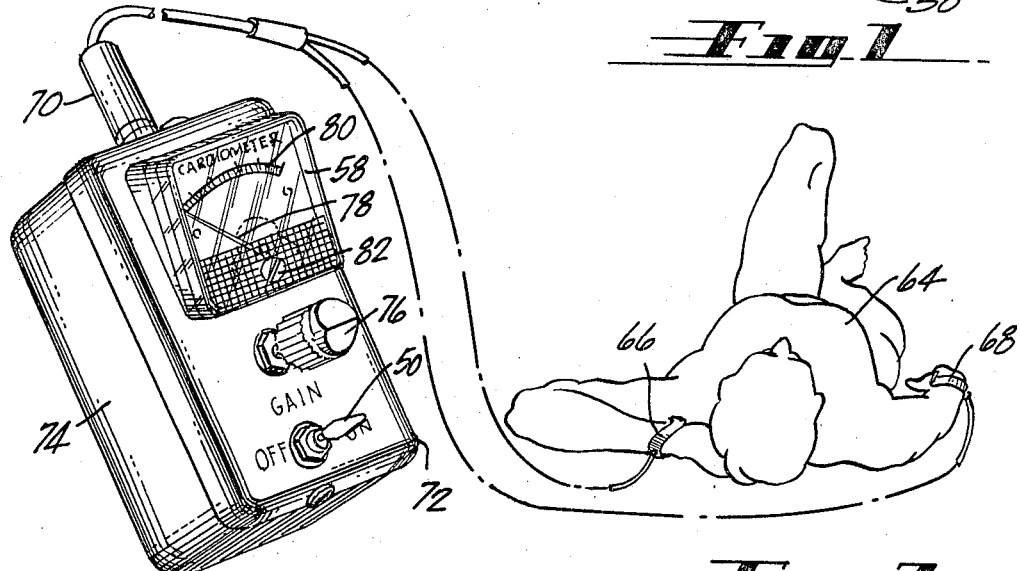
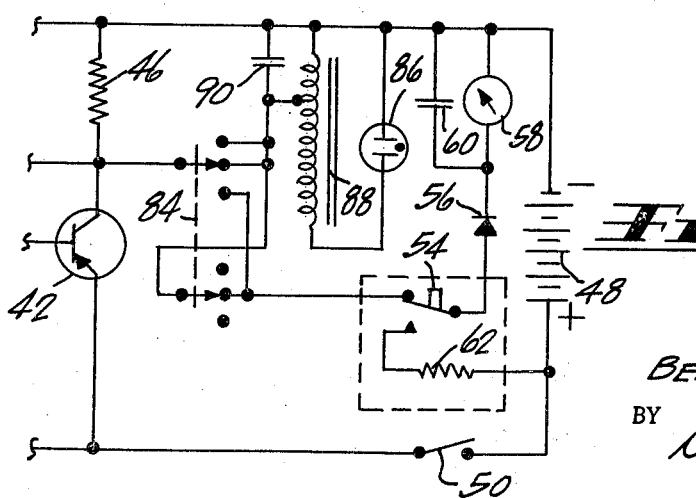
INVENTOR.
BERNARD B. KING
BY
- AGENT -

Jan. 27, 1970  B. B. KING  3,491,750
STETHOSCOPIC AND ELECTRICAL CARDIOMETER
Filed June 23, 1966  2 Sheets-Sheet 2

INVENTOR.
BERNARD B. KING
BY
- AGENT -

United States Patent Office 3,491,750
Patented Jan. 27, 1970

1

3,491,750
STETHOSCOPIC AND ELECTRICAL
CARDIOMETER
Bernard B. King, Venice, Calif., assignor, by mesne assignments, to McDonnell Douglas Corporation, Santa Monica, Calif., a corporation of Maryland
Filed June 23, 1966, Ser. No. 559,801
Int. Cl. A61b 5/04; G08b 21/00
U.S. Cl. 128—2.06                                                                 5 Claims

ABSTRACT OF THE DISCLOSURE

A small and portable cardiometer including a stethoscopic pickup head, a pair of electrode clips, amplifying means having an input and an output wherein the input connects directly with the pickup head or the electrode clips, visual indicating means connected to the amplifying means output and activated by the stethoscopically or electrically derived signals to indicate the heart action of a monitored body, and a battery for supplying the amplifying means and indicating means. The indicating means selectively includes a meter and/or a lamp. No-load and true load (which also generally tests the amplifying means) battery test means is included.

My present invention relates generally to medical test instruments and more particularly to an instrument for determining the life condition of the heart of a person or other animal.

The condition of a person's heart may be determined from its activity. For example, diagnosis of any heart or cardiac disorder is commonly accomplished with the aid of a stethoscope and electrocardiograph. The former instrument conveys to the physician's ear the sounds of the heart's action and the latter instrument produces a visual record of the changes in electrical potential occurring during each heartbeat. These instruments are extremely valuable to a trained individual in diagnosing irregularities of the heart action of a person.

In the area of rescue work, the rescue team is usually supplied with an ordinary acoustic stethoscope; however, an electrocardiograph is normally unavailable to the team in the field because of its size and complexity. In those instances where the heart of a person may be temporarily stopped, as in some cases of electrical shock and the like, life is still present if the electrical or galvanic heart signal is being generated in the person who may then respond beneficially to artificial resuscitation. Thus, the rescue team might not detect the presence of life in a person who may be in an extremely critical condition where the ordinary acoustic stethoscope is unable to pick up a very faint heartbeat, or where the heart has only temporarily stopped.

Heart muscle is highly susceptible to stimulation, and contracts if the stimulus is of a certain minimal intensity and duration. A special, pacemaker, tissue initiates each heartbeat in all adult animals and is located within the heart itself. Activity of the pacemaker, like that of other tissues, is accompanied by changes in electrical potential which can be detected and recorded by an electrocardiograph.

The more serious arrhythmias include auricular and ventricular fibrillation. Ventricular fibrillation, as is well-known, produces sudden death although in some instances where it is possible to effect defibrillation, as by the application of electrical shocks to the heart of the victim, death may be prevented. However, there is only a very

2 short period of time, usually only of the order of several minutes in which to effect defibrillation, otherwise all subsequent efforts at resuscitation will be futile.

The rescue teams are frequently composed of personnel untrained in diagnosing or intepreting irregularities of heart action. Fibrillation is characterized by a chaotic activity of the heart which beats at a high rate with a completely irregular rhythm. Moreover, the heart action can be such that the untrained person often will be unable to determine with an ordinary stethoscope whether there is even a heartbeat and, hence, any life remaining in the victim. However, activity of the heart muscle during fibrillation is manifested by random changes in electrical potential which could be easily detected and recorded by an electrocardiograph if such an instrument were available for use.

It is an object of my invention to provide a device which can readily pick up a very faint heartbeat or detect the presence of any life remaining in a person in a very critical condition where the ordinary stethoscope is unable to pick up the faint heartbeat sounds or when the heart may have temporarily stopped.

Another object of the invention is to provide a device for detecting a very faint heartbeat in a person or any presence of life remaining in the person where the heart may have temporarily stopped, wherein the device is small and simple to operate and can therefore be used in all environments.

A further object of the invention is to provide a device which is capable of producing an output indication of the life condition of the heart of a person from either a stethoscopic (acoustic) or electrical (galvanic) input signal.

A still further object of this invention is to provide a stethoscopic and electrical cardiometer which is supplied by its own battery and wherein means for a self-test by the cardiometer of its battery under no-load and load conditions is included.

Other objects and advantages of my invention will become apparent from the following description of an illustrative example thereof. A description of a modified version of the example is also given below. These descriptions are to be taken in conjunction with the accompanying drawings, in which:

FIGURE 1 is a circuit diagram of the illustrative example of my invention;

FIGURE 2 is a perspective view of the invention as used to detect the existence of a galvanic heart signal in a person;

FIGURE 3 is a fragmentary portion of a circuit diagram illustrating a modified version of this invention;

Figure 5:
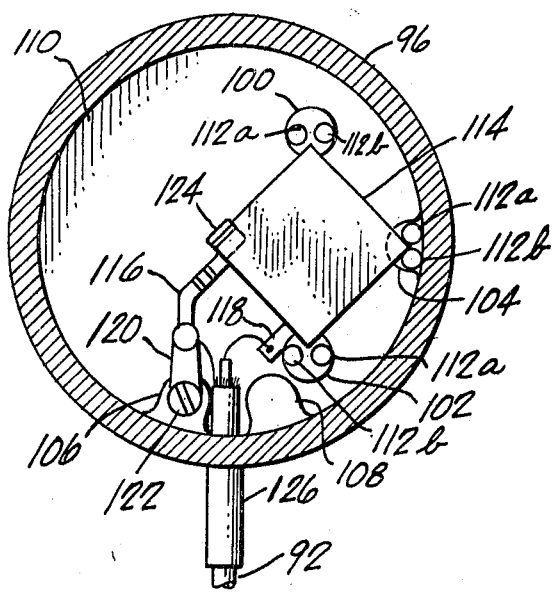
FIGURE 5 is a sectional view of the pickup head as taken along the line 5—5 indicated in FIGURE 4.

FIGURE 1 shows a preferred circuit diagram of this invention. A pickup head 10 is shown having its leads connecting with (plugged into) jack 12 which is connected to the base and emitter of amplifying transistor 14. Capacitor 16 is connected across the jack 12 and hence the pickup head 10 to attenuate high frequency signal components in order to eliminate certain high frequency "noise" signals. Resistor 18 and capacitor 20 constitute a decoupling filter providing the supply voltage to the transistor 14.

The amplified output of the transistor 14 is coupled by capacitor 22 to transistor 24. A capacitor 26 is connected between the base and emitter of the transistor 24 such that the high frequency signal components are mainly attenuated. This is particularly desirable when the low frequency heartbeat sounds are being monitored.

The output from the transistor 24 is applied through coupling capacitor 28 to a calibrate adjustment potentiometer 30 which is connected across the input of amplifying transistor 33. The potentiometer 30 provides an internal adjustment which is made during manufacture of the cardiometer. The potentiometer 30 is adjusted to give a uniform gain to each instrument and thus compensate for the component tolerances necessarily encountered in production.

The resistor 34 and capacitor 36 constitute another decoupling filter which supplies the transistors 24 annd 32. The output of the transistor 32 is applied through coupling capacitor 38 to a sensitivity or gain adjustment potentiometer 40 which is connected to the input of transistor 42. Bias resistor 44 is connected between the base and collector of the resistor 42, and a load resistor 46 connects the collector to the negative terminal of battery 48. Power switch 50 connects the positive terminal of battery 48 to the emitter of transistor 42.

A relatively large-valued capacitor 52 is connected across the load resistor 46. The purpose of the capacitor 52 is to shunt out much of the unnecessary and undesirable higher frequency signal components from the load. The output of the transistor 42 is also connected normally through pushbutton switch 54 and diode 56 to a microammeter 58. A capacitor 60 is connected across the meter 58 in order to damp meter movement. When the switch 54 is depressed, the diode 56 and meter 58 are connected to battery 48 through a scaling resistor 62. A no-load test of the battery 48 is obtained with the switch 50 open and a true load test thereof is obtained when the switch 50 is closed.

In normal usage, the battery 48 is replaced at regular intervals which are each somewhat less than the average shelf life of such batteries. Since it is very important that the battery 48 be in good condition at all times, no-load and loaded tests of the battery 48 are made periodically during each regular interval of use of a single battery. The tests under true load conditions are especially important since it is well-known that a battery may exhibit a full voltage under no-load conditions but which voltage promptly drops drastically under load. Suitable markings can be, of course, placed by the scale on the dial of the meter 58 to indicate the condition of the battery 48.

The value of the load resistor 46 is further selected in conjunction with the bias on the transistor 42, such that the steady state or quiescent collector current will be of a value that with the diode 56 and meter 58 combination, the meter 58 reads zero and is caused to swing in a positive direction only with a signal at the input of the circuit of FIGURE 1; that is, the input of transistor 14. In this manner, the selected value of the resistor 46 produces a condition, without input signal to the circuit, in which the threshold potential is applied to the diode 56 and meter 58 combination and any slight further signal will cause the meter 58 pointer to swing in a positive direction.

In operation, the pickup head 10 is placed on an appropriate body position to detect any heartbeat in a person or other animal. The pickup head 10 is a microphonic device which picks up sounds transmitted by the skin area contacted by the pickup head 10. The circuit of FIGURE 1, by adjustment of the potentiometer 40, can amplify the sounds up to 100 times if desired. Amplified sounds of the heartbeat of a person will be indicated by a pulsing movement of the pointer of the meter 58. The stronger the heartbeat, the greater will be the deflection, of course. The cardiometer thus functions as an electronic stethoscope which can detect very faint heartbeats which may not be detected with an ordinary acoustic stethoscope.

FIGURE 2 shows the use of my invention on, for example, a rescued swimmer 64 in whom a heartbeat was not detectable. In this instance, the stethoscopic pickup head 10 (FIGURE 1) was removed from jack 12 and replaced with a pair of electrical electrode clips 66 and 68. These clips 66 and 68 are preferably conductive metallic clips which are respectively attached to parts of the body on opposite sides of the heart. The clips 66 and 68 can be easily clipped onto the respective wrists, for example, of the swimmer 64. Each electrode clip is connected by a wire and combined into a single lead having a plug 70 which is plugged into the jack 12. No modification or adjustment of the circuitry of FIGURE 1 is required when electrode clips 66 and 68 are used directly in place of the stethoscopic pickup head 10.

The placement of the electrode clips 66 and 68 at points on opposite sides of the heart facilitates the pickup of the electrical or galvanic heart signal being generated in the swimmer 64. Detection of this signal will show that life is still present in the person and the action or characteristics of the signal will also indicate whether the heart has only a faint heartbeat or has only stopped temporarily or is in fibrillation. Prompt corrective action can then be taken according to the condition of the heart.

The cardiometer 72 illustrated in FIGURE 2 is an exceptionally small and portable unit for its useful functions. The casing 74 is only 2¼ inches wide, 3¾ inches long and 1¼ inch deep, approximately. The unit is shown in its basic configuration in FIGURE 2 since its structure and arrangement can be readily modified. The pushbutton switch 54 (FIGURE 1) has not been included, for example, because it can be incorporated with the power switch 50 in one version of the invention. Thus, the switch 50 could, in such instance, be a center "off" position toggle switch which may be switched in one direction to an "on" position and deflected to another direction to a momentary "test" position.

The knob 76 can be used to adjust the wiper of the potentiometer 40 (FIGURE 1) and meter 58 is located above the knob 76. The meter 58 has a pointer 78 which indicates against a scale 80 and the zero position of the pointer 78 can be adjusted by a cam-screw 82. Since the casing 74 will often be held in the hand of a person, it is to be noted that the circuit of FIGURE 1 is a floating circuit without any ground connection to the casing 74.

FIGURE 3 is a fragmentary portion of a circuit diagram replacing the circuit portion to the right of the transistor 42 in FIGURE 1 to illustrate a modified version of this invention. It can be seen that a double pole, three position switch 84, gaseous discharge lamp 86, autotransformer 88 and capacitor 90 have been added to the circuit of FIGURE 1. However, when the switch 84 has its poles placed in contact with their respective lower terminals, the circuit is then the same as that of FIGURE 1.

When the switch 84 has its poles placed in contact with their respective upper terminals, the output of the transistor 42 is applied to the primary winding portion of the autotransformer 88 across which portion is connected the capacitor 90. The capacitor 90 is charged by the output signal from the transistor 42 and discharged across the primary winding portion of the autotransformer 88 to fire the lamp 86 connected across the secondary winding. Thus, for the regular heartbeat, the lamp 86 is flashed on for each beat.

The turn ratio of the autotransformer 88 is selected so that the lamp 86 will be fired for input signals of at least a certain predetermined magnitude to cause the lamp 86 to respond to all desired input signals. Thus, during fibrillation the lamp 86 will flash on and off in a relatively rapid and random manner. This corresponds to a relatively rapid and random oscillation of the pointer 78 when the switch 84 poles are set to contact their respective lower terminals. When the poles of the switch 84 are placed in the position wherein the poles connect their respective center terminals, both the meter 58 and the lamp 86 will be energized to respond simultaneously to the input signals.

Figure 4:
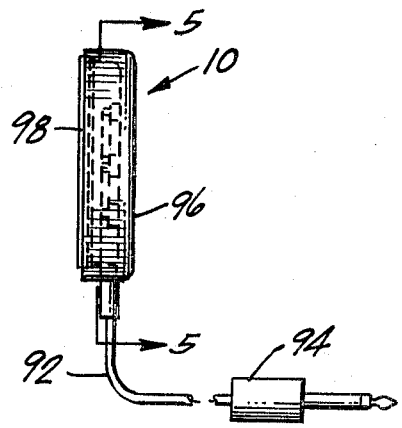
FIGURE 4 is a side elevational view of a pickup head and its connecting electrical lead for the invention.

FIGURE 4 shows the pickup head 10 with its connecting electrical lead 92 which is terminated at the free end by plug 94. The plug 94 is, of course, to be plugged into the jack 12 (FIGURE 1). The pickup head 10 has a case 96 of relatively high mass and density. The case 96 can be die-cast from a suitable material such as a zinc alloy. The case 96 has relatively thick walls and is disc-shaped with an open, normally rear or lower, face which is closed by a diaphragm assembly 98.

FIGURE 5 is a sectional view of the pickup head 10 as taken along the line 5—5 indicated in FIGURE 4. The case 96 has formed pedestals 100, 102, 104, 106 and 108 protruding from the inner floor 110 of case 96. The pedestals 100, 102 and 104 each has further formed thereon, a pair of closely spaced, positioning, cylindrical nubs 112a and 112b. The pedestals 100, 102 and 104 together with their respective pairs of nubs 112a and 112b, permit easy, accurate and firm mounting of a piezoelectric crystal 114. The crystal 114 is preferably a square wafer of Rochelle salts having three of its corners positioned between the nubs 112a and 112b of the pedestals 100, 102 and 104, and cemented securely thereon.

The crystal 114 has a lead 116 electrically connected to one of its square faces and another lead 118 electrically connected to the other square face. The free end of the lead 116 is suitably anchored to tab 120 which is attached to the pedestal 106 by a screw 122. The leads 116 and 118 are then suitably connected to the two electrical conductors, respectively, of the lead 92. A piston 124 is attached on one end to the free corner of the crystal 114 and has its other end attached to the diaphragm assembly 98.

Figure 7:
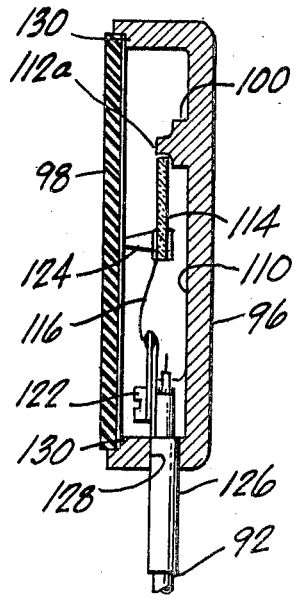
FIGURE 7 is a sectional view of the pickup head as taken along the line 7—7 indicated in FIGURE 6.
Figure 6:
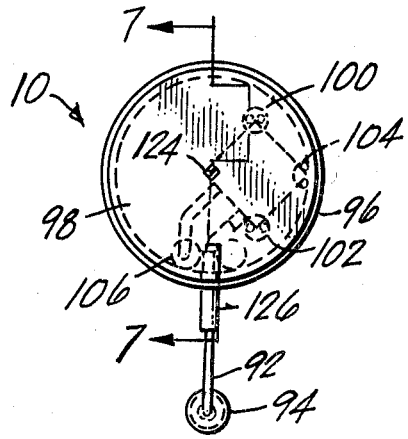
FIGURE 6 is a rear elevational view of the pickup head.

FIGURES 6 and 7 show that the outer end of piston 124 is attached to the center of the diaphragm assembly 98 at an inner point thereof. Any movement of the diaphragm assembly 98 is transmitted to the crystal 114 by the piston 124. The resulting distortion of the crystal 114 produces an electrical signal to the conductors of the lead 92 and this signal is amplified by the circuit of FIGURE 1. It can be seen in FIGURE 7 that the lead 92 is secured by a shrink tubing 126 which is fitted into the hole 128 in the case 96. The inner periphery of the diaphragm assembly 98 also rests against a shoulder ledge 130 of the case 96.

Figure 8:
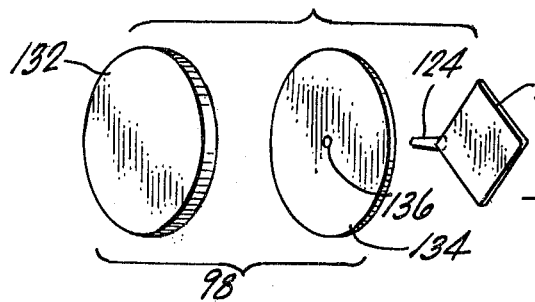
FIGURE 8 is an exploded view of the pickup head diaphragm assembly and its cooperative crystal and piston assembly.

FIGURE 8 shows an exploded view of the diaphragm assembly 98 in relation to the crystal 114 and its piston 124. The diaphragm assembly 98 comprises an outer disc 132 and an inner disc 134. The outer disc 132 is preferably made of a resilient and pliable material such as rubber. The rubber disc 132 is, for example, approximately 1½ inches in diameter and 1/16 inch thick. The inner disc 134 is preferably made of a thin brass sheet having a small hole 136 punched in its center.

The crystal 114 is first cemented to the pedestals 100, 102 and 104. The piston 124 is then cemented to the crystal 114 and the inner disc 134 is cemented to the ledge 130 of the case 96. The hole 136 receives the tip of the piston 124 and the tip is cemented in place in the hole 136. The outer disc 132 is carefully cemented to the inner disc 134 such that the outer disc 132 is intimately coupled to the inner disc 134.

The pickup head 10 is a particularly effective device in operation. The light crystal 114 is firmly fixed to a heavy base which is the relatively high mass and high density case 96. This case 96 mounts the very thin diaphragm or inner disc 134 of very small mass relative to the case 96. Thus, the inertia of the case 96 acts to hold the crystal 114 essentially still and only the sounds or their corresponding movements acting on the thin and light diaphragm or inner disc 134 will be transmitted to the crystal 114 by the piston 124.

The relatively thick and heavy case 96 effectively blocks out exterior sounds and noises, and permits pickup only of desired internal sounds which are sensitively detected by the thin and light diaphragm disc 134 and transmitted by piston 124 to the firmly fixed crystal 114. The case 96 is, for example, about 50 times as heavy as the crystal 114, and about 125 times as heavy as the diaphragm disc 134.

The rubber cover or outer disc 132 provides good matching and coupling characteristics with skin, for example, and it also serves to damp the diaphragm disc 134 and thus eliminate undesired high frequency signal components. Since the outer disc 132 is intimately coupled to the inner disc 134 by careful cementing, the higher frequency signal components are essentially filtered out such that the pickup head 10 functions as a contact microphone and is, therefore, only contact-responsive to sounds transmitted by the skin area contacting the rubber outer disc 132.

Figure 9:
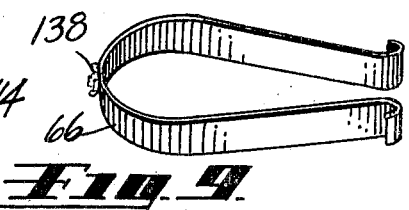
FIGURE 9 is a perspective view of an electrode clip which can be used with this invention.

FIGURE 9 shows an enlarged perspective view of the electrode clip 66 (FIGURE 2). The clips 66 and 68 are identical and each is generally U-shaped therefor as illustrated. The ends of the legs are turned back (recurved) in a relatively small radius to permit easy attachment of the clip 66 to a wrist or the like. An electrical receptacle 138 is riveted to the center of the arch portion of the clip 66. The receptacle can be a simple, multiple leaf, spring-sided receptacle which will grip a cylindrical terminal secured to the end of a connecting electrical wire or lead. The clip 66 is preferably made of a thin, flexible steel strip which has been chrome plated and bent into shape.

While only certain illustrative embodiments and exemplary portions of my invention have been described above and shown in the drawings, it is to be understood that various changes in design, structure and arrangement may be made therein without departing from the spirit of the invention.

I claim:
1. A small and portable stethoscopic and electrical cardiometer comprising:
means for detecting signals from a body including those associated with the heart action thereof, said detecting means providing characteristically corresponding electrical signals from said body signals and is a stethoscopic detecting means including a separate pickup head having a relatively high mass and high density disc-shaped case with an open end, a crystal firmly mounted in said case, a piston mounted on one end to said crystal, and a diaphragm assembly closing said open end and engaging the other end of said piston whereby sound pressure movements detected by said diaphragm assembly are transmitted to said crystal which produces electrical signals corresponding characteristically to the detected sound pressure movements, said diaphragm assembly comprising an inner disc engaging said other end of said piston and an outer disc made of a resilient and pliable material, and said case being of the order of 50 times as heavy as said crystal and of the order of 125 times as heavy as said inner disc;
amplifying means having an input and an output, and including means for adjusting the gain thereof, said input being connected directly to said detecting means to receive the electrical signals for amplification by said amplifying means;

visual indicating means connected to said output and activated by the signals amplified by said amplifying means whereby the heart action of said body is visually indicated by said indicating means;

a battery for supplying said amplifying means and said indicating means; and means operable at any time for testing said battery under no-load and true load conditions, said amplifying means being actually supplied by said battery under the true load testing condition.

2. A small and portable stethoscopic and electrical cardiometer comprising:

means for detecting signals from a body including those associated with the heart action thereof, said detecting means providing characteristically corresponding electrical signals from said body signals;

amplifying means having an input and an output, and including means for adjusting the gain thereof, said input being connected directly to said detecting means to receive the electrical signals for amplification by said amplifying means;

visual indicating means adapted to be activated by the signals amplified by said amplifying means whereby the heart action of said body is visually indicated by said indicating means;

a battery for supplying said amplifying means and said indicating means;

means operable at any time for testing said battery under no-load and true load conditions, said amplifying means being actually supplied by said battery under the true load testing condition;

diode means connecting said indicating means to said output of said amplifying means through said testing means, said testing means disconnecting said diode means from said output of said amplifying means and connecting said diode means to said battery during operation of said testing means, and said indicating means including a meter having a pointer which is deflected responsively in amplitude according to the magnitude of the signal applied through said testing means to said diode means, said meter being permitted by said diode means to respond only in a positive direction from a zero indication on receipt of any output signal from either of said amplifying means and said testing means, the deflection rate and amplitude of said pointer during normal indication of said meter being respectively representative of the rate and strength of the heart action of said body as detected by said detecting means, and the deflection amplitude of said pointer during test indication of said meter being generally representative of the condition of said battery under no-load and true load tests; and transformer means having a primary winding and a secondary winding, a lamp connected across said secondary winding, and switch means for selectively connecting said output of said amplifying means to any one connection arrangement of said testing means, said primary winding, and said testing means and said primary winding whereby a selection of any desired indicating configuration can be made from said meter, said lamp, and a combination of both said meter and said lamp.

3. The invention as defined in claim 1 including diode means connecting said indicating means to said output of said amplifying means through said testing means, said testing means disconnecting said diode means from said output of said amplifying means and connecting said diode means to said battery during operation of said testing means, and said indicating means including a meter having a pointer which is deflected responsively in amplitude according to the magnitude of the signal applied through said testing means to said diode means, said meter being permitted by said diode means to respond only in a positive direction from a zero indication on receipt of any output signal from either of said amplifying means and said testing means, the deflection rate and amplitude of said pointer during normal indication of said meter being respectively representative of the rate and strength of the heart action of said body as detected by said detecting means, and the deflection amplitude of said pointer during test indication of said meter being generally representative of the condition of said battery under no-load and true load tests.

4. The invention as defined in claim 3 further including an autotransformer having a primary winding and a secondary winding, a capacitor connected across said primary winding, a lamp connected across said secondary winding, and switch means for selectively connecting said output of said amplifying means to any one connection arrangement of said testing means, said primary winding, and said testing means and said primary winding whereby a selection of any desired indicating configuraton can be made from said meter, said lamp, and a combination of both said meter and said lamp.

5. A small and portable stethoscopic and electrical cardiometer comprising:

means for detecting signals from a body including those associated with the heart action thereof, said detecting means providing characteristically corresponding electrical signals from said body signals and is an electrical detecting means including a pair of electrode devices which are adapted to be attached to said body at respective points located on opposite sides of the heart of said body;

amplifying means having an input and an output, and including means for adjusting the gain thereof, said electrode devices being electrically connected directly to said input of said amplifying means whereby detected galvanic heart signals of said body are directly amplified by said amplifying means;

visual indicating means connected to said output and activated by the signals amplified by said amplifying means whereby the heart action of said body is visually indicated by said indicating means;

a battery for supplying said amplifying means and said indicating means;

means operable at any time for testing said battery under no-load and true load conditions, said amplifying means being actually supplied by said battery under the true load testing condition;

diode means connecting said indicating means to said output of said amplifying means through said testing means, said testing means disconnecting said diode means from said output of said amplifying means and connecting said diode means to said battery during operation of said testing means, and said indicating means including a meter having a pointer which is deflected responsively in amplitude according to the magnitude of the signal applied through said testing means to said diode means, said meter being permitted by said diode means to respond only in a positive direction from a zero indication on receipt of any output signal from either of said amplifying means and said testing means, the deflection rate and amplitude of said pointer during normal indication of said meter being respectively representative of the rate and strength of the heart action of said body as detected by said detecting means, and the deflection amplitude of said pointer during test indication of said meter being generally representative of the condition of said battery under no-load and true load tests; and an autotransformer having a primary winding and a secondary winding, a capacitor connected across said primary winding, a lamp connected across said secondary winding, and switch means for selectively connecting said output of said amplifying means to any one connection arrangement of said testing means, said primary winding, and said testing means and said primary winding whereby a selection of any desired indicating configuration can be made from said meter, said lamp, and a combination of both said meter and said lamp.

References Cited

UNITED STATES PATENTS

| | | | |
|---|---|---|---|
| 2,918,054 | 12/1959 | Goolkasian | 128—2.05 |
| 3,027,891 | 4/1962 | Fields et al. | 128—2.06 |
| 3,156,235 | 11/1964 | Jaeger | 128—2.05 |
| 3,182,129 | 5/1965 | Clark et al. | 128—2.05 X |
| 3,243,795 | 3/1966 | O'Brien | 340—249 |

WILLIAM E. KAMM, Primary Examiner